(12) United States Patent
Kiriki et al.

(10) Patent No.: US 6,219,446 B1
(45) Date of Patent: *Apr. 17, 2001

(54) IMAGE FORMING APPARATUS AND MANUFACTURING METHOD OF LENS FITTED FILM UNIT

(75) Inventors: Toshihiko Kiriki, Hachioji; Tsuyoshi Haraguchi, Hino; Nobuyoshi Mori, Hachioji; Takao Hosaka; Tetsufumi Takaba, both of Hino, all of (JP)

(73) Assignee: Konica Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,124

(22) Filed: May 19, 1998

(30) Foreign Application Priority Data

May 21, 1997 (JP) .................................................. 9-130975

(51) Int. Cl.⁷ ...................................................... G06K 9/00
(52) U.S. Cl. ......................... 382/167; 358/302; 396/311; 348/241
(58) Field of Search .................................... 348/241, 251, 348/263; 382/167; 358/518, 523, 445, 487, 527; 396/311, 319, 318; 355/40, 302

(56) References Cited

U.S. PATENT DOCUMENTS

| | | | | |
|---|---|---|---|---|
| 5,353,056 | * | 10/1994 | Westerink et al. | 348/263 |
| 5,365,303 | * | 11/1994 | Yamasaki et al. | 396/311 |
| 5,430,559 | * | 7/1995 | Hirota | 358/516 |
| 5,461,440 | * | 10/1995 | Toyoda | 358/487 |
| 5,739,924 | * | 4/1998 | Sano | 358/487 |
| 5,859,933 | * | 1/1999 | Sasanuma et al. | 382/275 |
| 5,885,759 | * | 3/1999 | Nakamura | 396/311 |
| 6,011,582 | * | 1/2000 | Schmuze et al. | 348/97 |
| 6,018,381 | * | 1/2000 | Vanderbrook et al. | 355/38 |

* cited by examiner

*Primary Examiner*—Amelia Au
*Assistant Examiner*—Jingge Wu
(74) *Attorney, Agent, or Firm*—Jordan B. Bierman; Bierman, Muserlian and Lucas

(57) ABSTRACT

An image forming apparatus includes: a first reading device for reading an image recorded on a recording medium; a storing device for storing a signal of a reference image representing a reference to correct the image recorded on the recording medium; a second reading device for reading a chart image obtained by recording the reference image; a calculating device for calculating image correction data by comparing the signal of the reference image with a signal of the chart image; an image processing device for correcting the image signal read by the first reading device on the basis of the image correction data; and an outputting device for outputting an image on the basis of the image signal corrected by the image processing device.

6 Claims, 7 Drawing Sheets

IMAGE FORMING APPARATUS AND MANUFACTURING METHOD OF LENS FITTED FILM UNIT

BACKGROUND OF THE INVENTION

The present invention relates to an image forming apparatus wherein, even when using a lens-fitted film unit whose lens performance is relatively poor and a digital camera, the lens performance can be properly compensated for by processing after photographing, and to a manufacturing method of a lens-fitted film unit in which a function to compensate lens performance is provided as well as to the lens-fitted film unit.

When compared with a lens shutter camera and a single-lens reflex camera which are of the middle class or higher, lens-fitted film units sometimes tend to be inferior in terms of performance because they need to be manufactured at a lowest cost. In addition, in the field of lens-fitted film units, there is a severe competition to make them as small as possible, which makes a sacrifice of the performance.

With regard to performance of a photographic lens, for example, a distortion of a lens-fitted film unit is 5% or less, while that of a lens shutter camera and a single-lens reflex camera which are of the middle class or higher is 3% or less, lateral chromatic aberration of the former is 0.03 mm while that of the latter is 0.1 mm or less, and marginal light quantity for the former is 30% or less while that for the latter is 25% or less, which has been undeniable as a difference in the performance. Incidentally, problems similar to the problems mentioned above are caused also in a digital camera employing an inexpensive lens.

Further, with regard to marginal light quantity for strobe (a difference of quantity of light between the center and the periphery), it was 0.5 EV or less for a lens shutter camera and a single-lens reflex camera which are of the middle class or higher, while it was 1 EV or less for a lens-fitted film unit.

Though there is also available a lens-fitted film unit in which scenery of a tourist resort is photographed on the first frame in advance before shipment, this is nothing but one which simply provides a picture postcard to a user, and this image information is not utilized for processing of prints.

It is impossible, from a viewpoint of cost, for a lens-fitted film unit to have performance similar to that of a lens shutter camera and a single-lens reflex camera which are of the middle class or higher, and a lens-fitted film unit having that performance is hard to be made small. It is therefore possible not to cast a burden upon a lens-fitted film unit, if it is realizable that a lens and a strobe each having relatively poor performance are used for photographing and those performances are compensated in the subsequent processing of prints.

SUMMARY OF THE INVENTION

In view of the problems mentioned above, objects of the invention is to provide an image forming apparatus wherein performances of a lens and a strobe are recorded in a lens-fitted film unit in advance separately, and these performances are compensated in the processing of prints by the use of the aforesaid recorded information, and to provide a manufacturing method for the lens-fitted film unit.

The objects mentioned above can be achieved by any of the following composition.

An image forming apparatus having therein a reading means which reads images recorded on a recording medium, a storing means in which signals of a reference image which serves as a reference for correcting the images recorded in the aforesaid recording medium are stored in advance, a calculating means which compares signals obtained by reading a chart image obtained by recording the aforesaid reference image with signals of the aforesaid reference image to operate image correction data, an image processing means which corrects signals of the image read by the reading means mentioned above, and an output means which outputs signals of the corrected image.

A manufacturing method of a lens-fitted film unit to load an unexposed film in a manufacturing process in advance, wherein there is provided a process to record, on the aforesaid unexposed film, a chart representing characteristics of at least one of the distortion of a photographic lens, lateral chromatic aberration, a ratio of marginal light quantity and luminous intensity distribution of a strobe.

BRIEF DESCRIPTION OF THE DRAWINGS

Each of FIGS. 1(A) and 1(B) represents a diagram illustrating the distortion.

Each of FIGS. 2(A) and 2(B) represents a diagram illustrating a size of the distortion.

Each of FIGS. 5(A) and 5(B) represents a diagram of a reference image and of a chart relating to the distortion.

Each of FIGS. 6(A) and 6(B) represents a diagram of a reference image and of a chart relating to lateral chromatic aberration.

Each of FIGS. 7(A) and 7(B) represents a diagram of a reference image and of a chart relating to the ratio of marginal light quantity.

An embodiment of the invention will be explained in detail with reference to FIGS. 1 (A)–8.

A distortion will first be explained with reference to FIGS. 1(A)–1(B) and FIGS. 2(A)–2(B).

Figure 1:
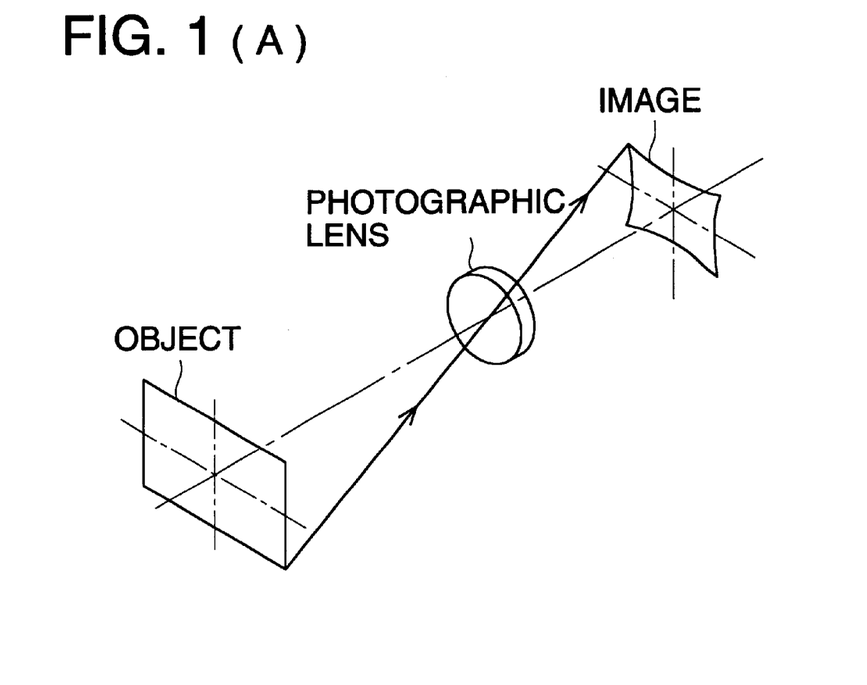

The distortion is aberration which does not deteriorate sharpness of an image but distorts a geometrical shape of an object without reproducing it faithfully. In this case, when a rectangle is drawn on a plane of an object, four sides of the rectangle appear to be curved lines on the image plane after being photographed, as shown in FIGS. 1(A) and 1(B). A phenomenon wherein an image is distorted inward as shown in FIG. 1(A) is called a pincushion distortion, and a phenomenon wherein an image is distorted outwardly as shown in FIG. 1(B) is called a barrel form distortion.

Figure 2:
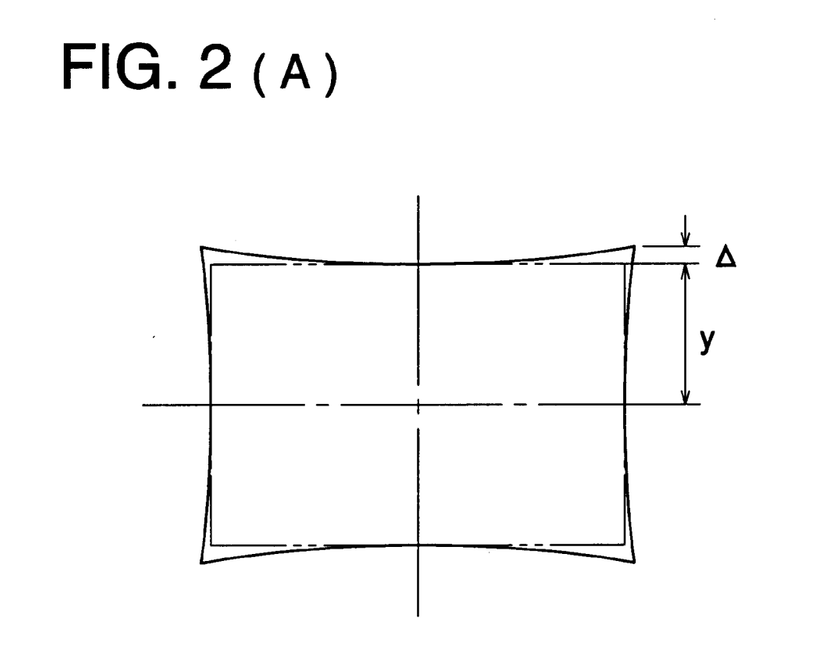

A degree of the distortion can be expressed by the following expression when y represents an ideal image height and Δ represents an amount of expansion as shown in the pincushion distortion in FIG. 2(A) and the barrel form distortion in FIG. 2(B).

Degree of distortion=($\Delta$/y)×100 (%)

Though this distortion can be reduced by lens design, it can not be avoided that the distortion is great to a certain extent, because the number of lenses is one or two in a lens-fitted film unit.

Next, lateral chromatic aberration will be explained as follows.

A refractive index of light varies depending on its wavelength, and a refractive index of light having shorter wavelength is greater, while a refractive index of light having longer wavelength is smaller. Due to this, there appears a phenomenon wherein an image forming position varies depending on a wavelength of light, and this phenomenon is called a chromatic aberration. The chromatic aberration includes a longitudinal chromatic aberration wherein an image forming position varies on an optical axis depending on a wavelength and a lateral chromatic aberration wherein an image magnification varies depending on a wavelength, and the lateral chromatic aberration will be explained here with reference to FIGS. 3 and 4.

Figure 3:
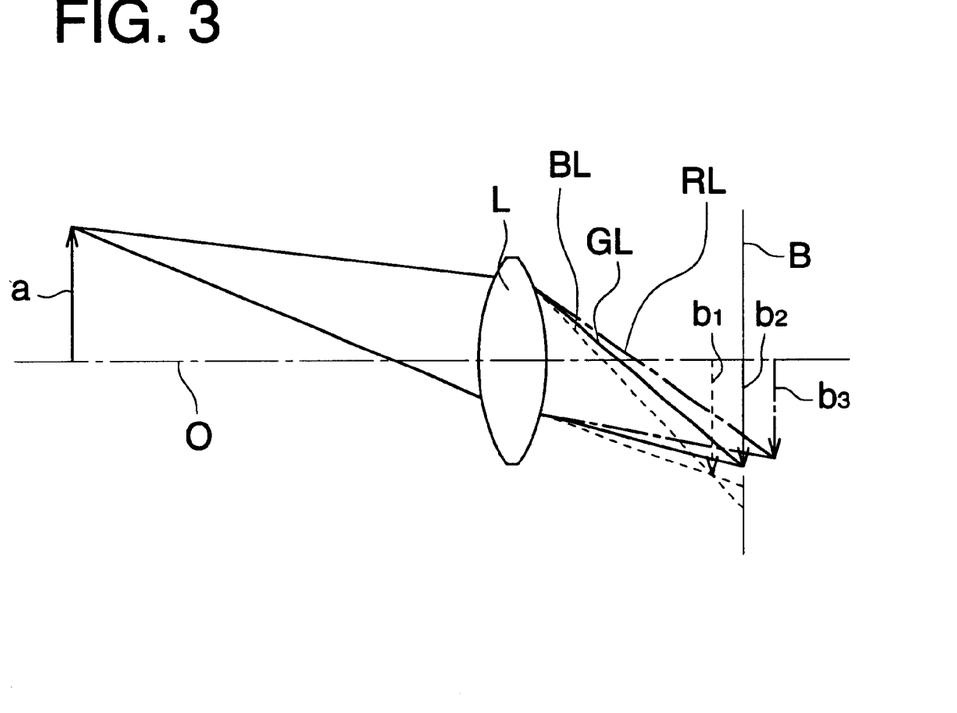
FIG. 3 is a diagram illustrating lateral chromatic aberration.

When oblique light which is outside optical axis 0 enters photographic lens L, not only an image forming position but also an image size vary depending on a wavelength. Namely, object "a" represented by green light GL is formed on plane B to be of a length of $b_2$, while the object represented by blue light BL which is shorter than green light GL and is shown with dotted lines is formed before the plane B to be of a length of $b_1$ which is longer than $b_2$ and the object represented by red light RL which is longer than green light GL and is shown with one-dot chain lines is formed behind the plane B to be of a length of $b_3$ which is shorter than $b_2$.

Figure 4:
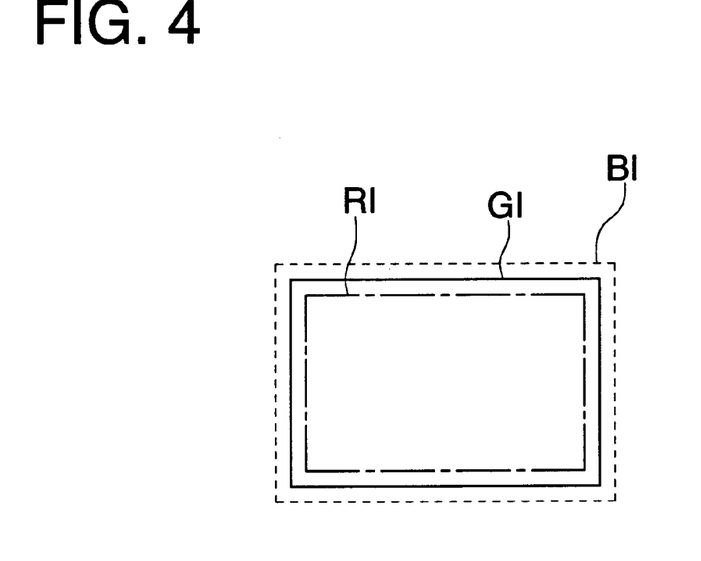
FIG. 4 is an illustration of an image plane where lateral chromatic aberration is caused.

Aberration of this kind is called a lateral chromatic aberration which causes an image representing green light image GI, blue light image BI and red light image RI on a photographed image plane as shown in FIG. 4, and all colors are not focused on the same position and thereby sharpness of the image is deteriorated.

In the case of a lens-fitted film unit, however, it is allowed that lateral chromatic aberration is great to a certain extent.

Next, a ratio of marginal light quantity will be explained as follows.

Brightness at a point on an image formed by a lens is lowered gradually as the point recedes from the center to the periphery of the image. Namely, a quantity of light to be formed on the periphery is less than that to be formed on the center. This is caused by an eclipse of an optical axis and by a $\cos^4$ law, and is unavoidable in physical and optical characteristics. However, brightness on the periphery varies depending on lens design and a position of an aperture. The ratio of brightness on the periphery to that on the center is called a marginal light quantity ratio.

In the case of a lens-fitted film unit, however, the marginal light quantity ratio which is slightly lowered is also allowed.

The marginal light quantity is also lowered by strobe-aided photographing. In a strobe, light emitted from a xenon tube is collected by a reflector, and distribution of a quantity of light covering from the center to the periphery within a range of a field angle of a photographic lens is called a light distribution characteristic. Since the light distribution characteristic is not affected by physical properties, which is different from the marginal light quantity of a lens, a decline of the marginal light quantity can be controlled to a certain extent. For that purpose, however, a large reflector and a main capacitor with large capacity are needed. However, a measure of this kind is difficult in the case of a lens-fitted film unit which is intended to be small and inexpensive, and a reflector and a main capacitor both in a lens-fitted film unit are formed to be smaller when compared with those in a lens shutter camera. As a result, it is unavoidable that a light distribution characteristic of a strobe in a lens-fitted film unit is somewhat deteriorated.

In the invention, it is allowed that characteristics of a photographic lens such as distortion, lateral chromatic aberration and marginal light quantity as well as light distribution characteristic of a strobe when it is housed are somewhat inferior in a lens-fitted film unit, compared with a single-lens reflex camera and a lens shutter camera, and the inferior characteristics are left as they are without being improved, but the characteristics are compensated in processing of prints.

In the case of a lens-fitted film unit, an exposed film is loaded therein in the manufacturing process in advance before shipment of the lens-fitted film unit so that the unexposed film only is exposed for photographing. Therefore, it is possible to handle the film and a photographic lens as a pair. Accordingly, if a chart representing characteristics of a photographic lens and light distribution characteristic of a strobe is photographed previously on a film frame which is not used for photographing, namely a film frame positioned before or behind film frames used for photographing, it is possible to make correction using that information on the chart.

An example thereof will be explained with reference to FIGS. 5(A)–7(B).

A method to prepare a chart of distortion will be explained with reference to FIGS. 5(A) and 5(B). First, a reference image having therein plural vertical lines and horizontal lines as shown in FIG. 5(A) is prepared, and this reference image is photographed on a film frame positioned before or behind film frames used for photographing in the unexposed film in the manufacturing process. Thereupon, a chart wherein vertical lines and horizontal lines are distorted as shown in FIG. 5(B) is formed on the film despite photographing of the reference image wherein lines are not distorted, because a photographic lens of a lens-fitted film unit has distortion as stated above. In this example, the distortion is of a pincushion distortion. Therefore, when this chart wherein distorted lines are recorded is read first by a printer stated later, and then is compared with a signal of the reference image stored in advance, namely with a signal of the reference image having no distorted lines, and thereby image processing is conducted so that distorted lines on the film frame photographed by a user may turn into straight lines, it is possible to obtain a print in which all distortions are corrected.

Figure 6A:
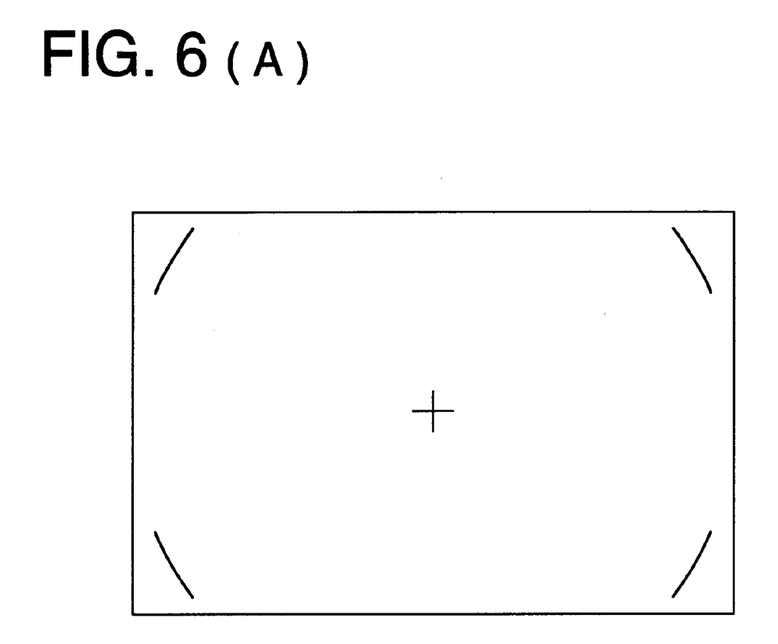
Figure 6B:
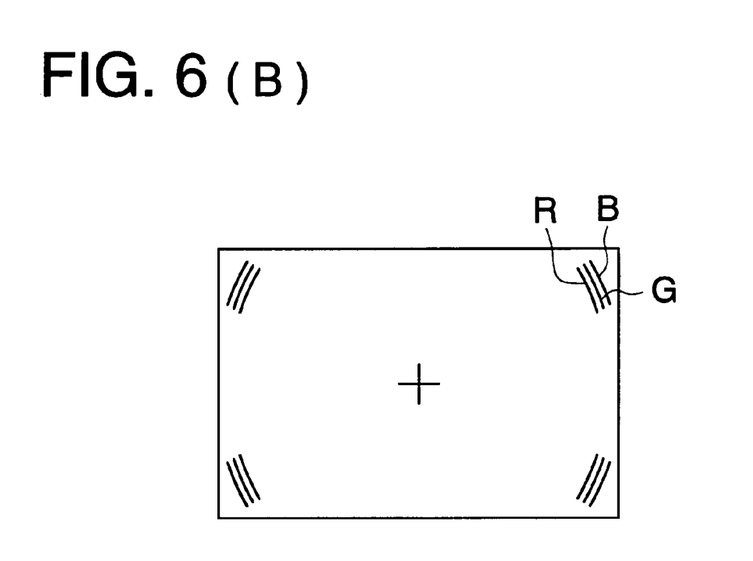

Next, a method to prepare a chart of lateral chromatic aberration will be explained with reference to FIGS. 6(A) and 6(B). First, a reference image having an arc on each of its corners and having no lateral chromatic aberration as shown in FIG. 6(A) is prepared, and this reference image is photographed on a film frame positioned before or behind film frames used for photographing in the unexposed film (color film in this case) in the manufacturing process. Thereupon, there is formed on the film a chart wherein lateral chromatic aberration appears to be separated to red )R), green (G) and blue (B) lines at each corner as shown in FIG. 6 (B), because a photographic lens of a lens-fitted film unit has lateral chromatic aberration as stated above. Therefore, when this chart wherein the lateral chromatic aberration is caused is read first by a printer stated later, and then is compared with a signal of the reference image stored in advance, namely with a signal of the reference image having no lateral chromatic aberration, and thereby image processing is conducted so that the red (R), green (G) and blue (B) lines on the film frame photographed by a user may turn into a single line, it is possible to obtain a print in which all lateral chromatic aberration are corrected.

Figure 7A:
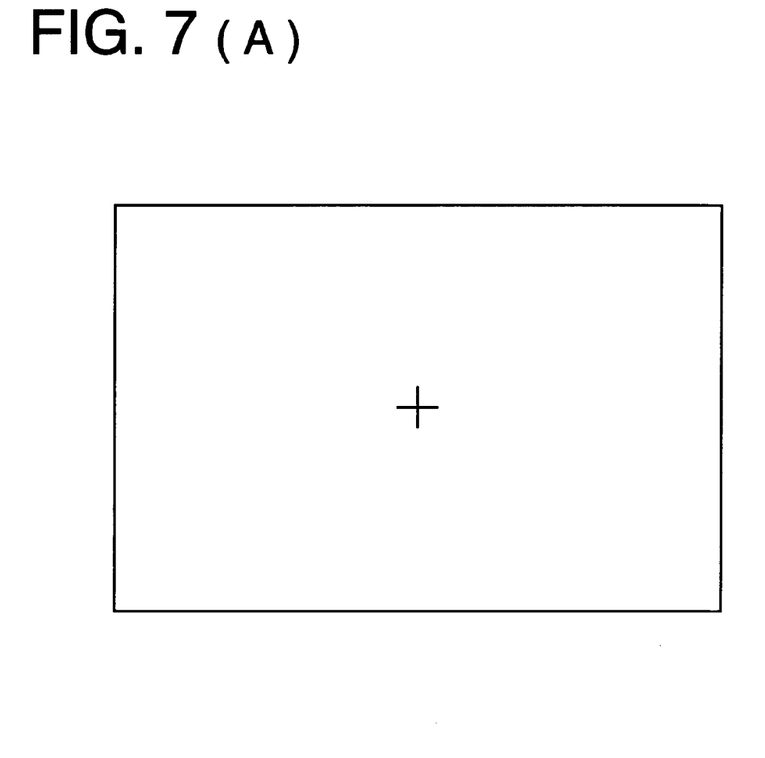
Figure 7B:
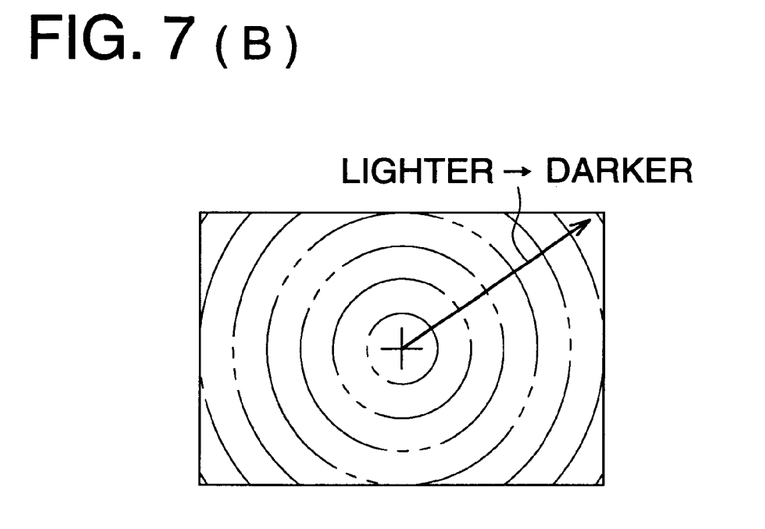

Further, a method to prepare a chart of a marginal light quantity ratio will be explained with reference to FIGS. 7(A) and 7(B). First, a reference image wherein density is constant from the center to the periphery in white color or bright color as shown in FIG. 7(A) is prepared, and this reference image is photographed on a film frame positioned before or behind film frames used for photographing in the unexposed film in the manufacturing process. Thereupon, there is formed on the film a chart wherein density falls as the point concerning the density moves from the center to the periphery as shown in FIG. 7 (B), because a light quantity falls sharply on the periphery in the case of a photographic lens of a lens-fitted film unit. Therefore, when this chart showing the marginal light quantity ratio is read first by a printer stated later, and then is compared with a signal of the reference image stored in advance, namely, a signal of the reference image wherein density is constant from the center to the periphery, and thereby image processing is conducted so that the density may be constant from the center to the periphery in the frame photographed by a user, it is possible to obtain a print in which all marginal light quantity ratios are corrected.

In the case of a built-in strobe having insufficient light distribution characteristics alone, the image processing as in the case of that for marginal light quantity can compensate the insufficient light distribution characteristics. However, an image formed on a film through photographing is affected by both a marginal light quantity ratio of a photographic lens and a light distribution characteristic of a strobe, which causes lowered density on the periphery. Incidentally, in the case of a lens-fitted film unit housing therein a strobe, the strobe is not necessarily used all the time for photographing. Therefore, it is necessary that a frame showing only a marginal light quantity ratio of a photographic lens without using a strobe for photographing and a frame showing both a marginal light quantity ratio of a photographic lens and a light distribution characteristic of the strobe after photographing using the strobe, are photographed on the film, and these frames are arranged to be discriminated clearly.

Incidentally, in the manufacturing process, work efficiency is improved when a job to photograph, on a film, a chart showing a light distribution characteristic of a strobe and a job to inspect strobe emission are conducted simultaneously.

Figure 8:
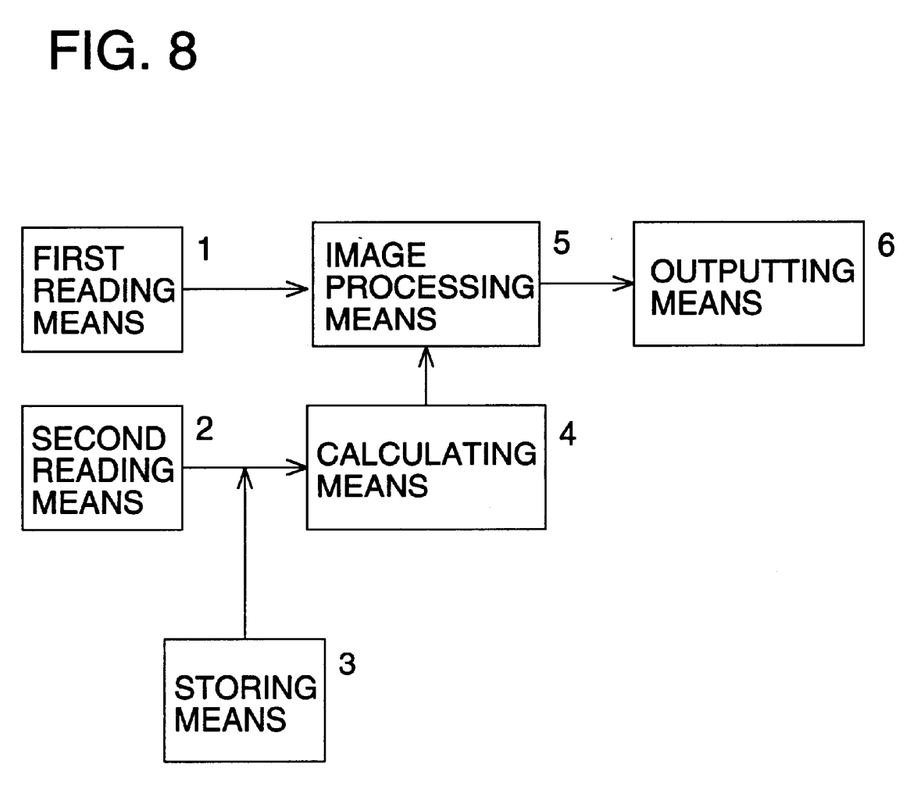
FIG. 8 is a block diagram of an image forming apparatus which corrects the distortion.

Next, an image forming apparatus wherein the distortion, the lateral chromatic aberration, the marginal light quantity ratio and the light distribution characteristic of a strobe all mentioned above are corrected will be explained with reference to a block diagram in FIG. 8.

As stated above, on a film representing the recording medium exposed by the lens-fitted film unit in the present embodiment, there is photographed, in the manufacturing process in advance, at least one of the charts for distortion, lateral chromatic aberration, marginal light quantity ratio and light distribution characteristics of a strobe, together with images exposed through photographing by a user. Then, the film is developed and the negative thus obtained is read by both the first reading means 1 and the second reading means 2 shown in FIG. 8, in which images formed through photographing by a user are read by the first reading means 1 and the chart photographed in the manufacturing process is read by the second reading means 2. For the purpose of reading the negative, a prescribed lens is used for forming images on CCD which are converted to image signals through photoelectric conversion. Incidentally, it is possible either to provide the first reading means and the second reading means separately or to use the same reading means in common for both purposes of the first and second reading means. When reading images recorded on a photographic film, paper and a resin film, a scanner can be used as a reading means. When reading images recorded on CD-ROM, FD, MD, MO and DVD or on digital information recording media such as recording media for various digital cameras, these reproduction apparatuses can be used as a reading means.

Figure 5:
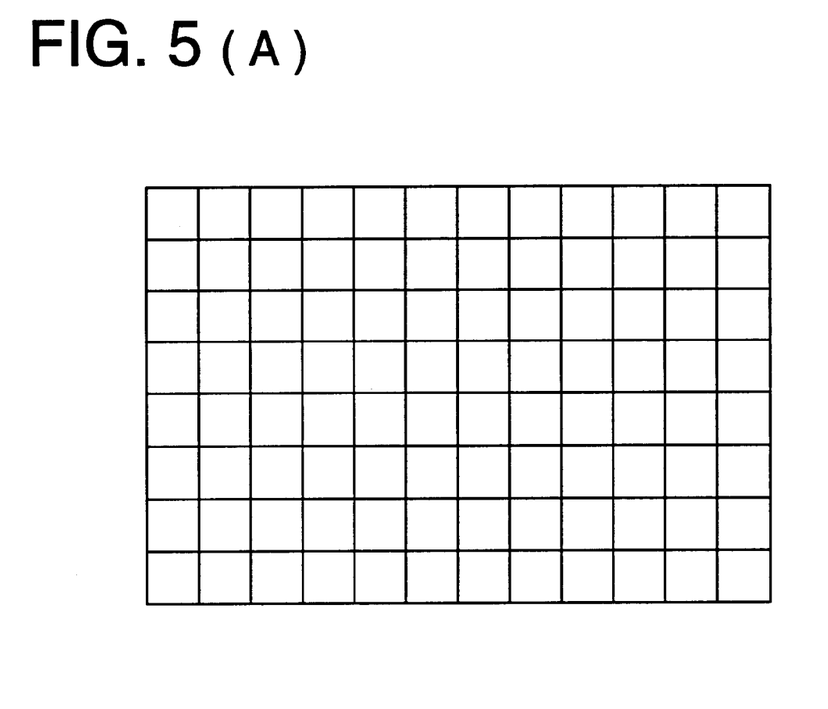

On the other hand, on storing means 3, there are stored signals of reference images corresponding to FIG. 5 (A), FIG. 6 (A) and FIG. 7 (A) which are related to distortion, lateral chromatic aberration, a marginal light quantity ratio and light distribution characteristics. In calculating means 4, signals of chart images coming from the second reading means 2 and signals of the reference image coming from storing means 3 are compared with each other, and image correction data are calculated. Incidentally, as the storing means, it is possible to use a memory, RAM and a hard disk, or digital information recording media such as CD-ROM, FD, MD, MO and DVD, as well as recording apparatuses therefor. In particular, a memory, RAM and a hard disk are preferable.

The image correction data and image signals from the first reading means are inputted in image processing means 5. As a result, distortion, lateral chromatic aberration, a marginal light quantity ratio and light distribution characteristics of a strobe are corrected by the image signals, and corrected image signals are outputted from outputting means 6. In the outputting means, a color photographic light-sensitive material is exposed to blue light, green light and red light all based on the corrected image signals, and a blue image, a green image and a red image thus obtained are superposed to form a print. Incidentally, it is possible to use CPU and others as a calculating means and an image processing means. It is possible either to provide the calculating means and the image processing means separately, or to use the same CPU for both purposes. As an outputting means, a printer wherein an image is printed on a photographic light-sensitive material such as a photographic paper by a laser, a monitor or LED array is preferable, but an ink jet printer, a laser beam printer and a monitor can also be used without being limited to the foregoing. For digital image information, a recording apparatus to record on digital information recording medium such as CD-ROM, FD, MD, MO or DVD can also be used.

Incidentally, it is also possible to incorporate the storing means 3, the calculating means 4 and the image processing means 5 in a single apparatus so that the apparatus may serve as an image processing apparatus. As one way in that case, the reference image only is stored in the storing means 3, and image processing apparatus has therein a reading means which reads chart images, or data of chart images are sent from a separate and independent reading means to the image processing apparatus. Or, in the other way, the reference image and the chart images are stored in the storing means 3 so that image correction data are calculated. Or, it is also possible to make an arrangement wherein only image correction data are stored in the storing means 3, while, neither the chart image nor the reference image is stored in the storing means 3.

Incidentally, some lens-fitted film units are constituted so that an image plane size can be switched from the standard size to a panoramic size and a high vision size, and in the case of those employing an APS film, it is possible to constitute so that three kinds of image plane sizes including C, H and P can be selected. In this case, it is preferable that the chart mentioned above is photographed on the largest image plane.

There are some occasions wherein design changes are made, on the half way of manufacturing a lens-fitted film unit, for a photographic lens and a strobe and shapes and functions of parts thereof are changed for the reasons of design and manufacture. It is preferable that manufacture information of this kind is informed to photofinishing laboratories affiliating with the manufacturer, although the manufacture information has nothing to do with users. Therefore, if a lot number, for example, is photographed together with the chart mentioned above as the manufacture information, the photofinishing laboratory can learn, after seeing a film, the lot number of the lens-fitted film unit used for photographing on the film.

It is more preferable to prepare one chart in which distortion, lateral chromatic aberration and marginal light quantity ratio are composed and to record the chart, without recording each chart including each of distortion, lateral chromatic aberration and marginal light quantity ratio.

With regard to a chart image, is also allowed to photograph the reference image on a photographic film in each lens-fitted film unit for recording.

It is further allowed that a chart image for each type of a lens-fitted film unit is recorded on a specific recording medium and the chart image is distributed to each photofinishing laboratory to make an image forming apparatus in the photofinishing laboratory to read the chart image. In that case, it is preferable that a means to discriminate the type of the lens-fitted film unit, or a means to input the type of the lens-fitted film unit is provided on the image forming apparatus so that image processing may be conducted with image correction data corresponding to the type of the lens-fitted film unit. As the specific recording medium, it is possible to use a film and paper on each of which a chart image is recorded, and digital information recording medium such as CD-ROM, FD, MD, MO and DVD on each of which signals of a chart image are recorded. On the specific recording medium, not only a chart image but also a reference image can be recorded. It is also possible to transmit a chart image and a reference image to an image forming apparatus through a communication means to be recorded.

It is further possible that image correction data obtained from comparison between a chart image and a reference image for each type of a lens-fitted film unit are recorded on the specific recording medium, in place of a chart image for each type of the lens-fitted film unit, and the image correction data are read by an image forming apparatus so that the image correction data for each type of the lens-fitted film unit are stored in a storage means. As the specific recording medium, digital information recording media such as CD-ROM, FD, MD, MO, and DVD can be used. It is also possible to transmit image correction data to an image forming apparatus through a communication means to be recorded.

Further, the invention can be applied not only to a lens-fitted film unit but also to an image recorded by a digital camera, and distortion, lateral chromatic aberration, marginal light quantity ratio all caused by a lens of the digital camera or a strobe light distribution characteristic can be corrected. In that case, an image reading means of an image forming apparatus includes CD-ROM, FD, MD, MO, DVD, or reproduction units such as recording media for various digital cameras. Incidentally, it is also allowed that signals of the chart image obtained by photographing a reference image with the digital camera are recorded on each recording medium for a digital camera, or it is possible to record a chart image for each type of a digital camera on the specific recording medium to make an image forming apparatus to read the chart image. It is further possible that image correction data obtained from comparison between a chart image and-a reference image for each type of a digital camera are recorded on the specific recording medium, in place of a chart image for each digital camera, and the image correction data are read by an image forming apparatus so that the image correction data for each type of the digital camera are stored in a storage means. The disclosed embodiment can be varied by a skilled person without departing from the spirit and scope of the invention.

In the image forming apparatus and the manufacturing method of a lens-fitted film unit, performance of a lens and a strobe are recorded in the lens-fitted film unit in advance, and these recorded information are used in print processing for improving the performance. Therefore, even in the case of photographing by a lens-fitted film unit equipped with a lens and a strobe which are relatively poor in terms of performance, it is possible to obtain a print having the same image quality as in those made by a lens shutter camera of a middle-class or higher and a single-lens reflex camera. Therefore, a lens-fitted film unit can keep its present performance, and it is not necessary to increase cost for improvement of performance and to use large parts.

It is also possible to obtain the same effect on a digital camera.

What is claimed is:

1. A photographic image forming apparatus comprising:

(a) a first reading means for reading a photographic image recorded on a photographic image area of a photographic film housed in a lens-fitted film unit;

(b) a storing means for storing a signal of a reference image representing a reference to correct the photographic image recorded on the photographic image area of the photographic film;

(c) a second reading means for reading a chart image recorded on the photographic image area of the photographic film, obtained by recording the reference image;

(d) a calculating means for calculating image correction data by comparing the signal of the reference image with a signal of the chart image, wherein said image correction data includes data for correcting errors in image distortion, lateral chromatic aberration, marginal light quantity ratio and the light distribution characteristic of a strobe;

(e) a photographic image processing means for correcting a photographic image signal read by the first reading means on the basis of the image correction data; and (f) an outputting means for outputting a photographic image on the basis of the image signal corrected by the image processing means.

2. The image forming apparatus of claim 1, wherein the reference image is at least one of an image having no distortion, an image having no lateral chromatic aberration, an image in which density is constant from a center to a periphery of a frame of the photographic film, or an image in which density is constant from the center to the periphery of a film frame in case of strobe-aided photographing.

3. The image forming apparatus of claim 1, wherein the image recorded on the photographic film has been recorded through a photographic lens, and the image correction data is data for correcting at least one of characteristics of distortion, lateral chromatic aberration, a marginal light quantity ratio caused by the photographic lens, or light distribution characteristic of a strobe.

4. The image forming apparatus of claim 1, wherein the chart image is an image in which the reference image is recorded through a photographic lens, or an image corresponding thereto.

5. The image forming apparatus of claim 1, wherein the the chart image has been recorded in advance on the photographic film housed in the lens-fitted film unit.

6. A photographic image forming method comprising the steps of:

(a) recording a chart image onto a photographic image area of a photographic film by photographing a reference image which represents a reference to correct a photographic image recorded on the image area of the photographic film;

(b) reading the chart image recorded on the photographic film;

(c) comparing data of the chart image recorded on the photographic film with data of the reference image and thereby obtaining image correction data;

(d) reading the photographic image recorded on the photographic film;

(e) correcting data of the read image on the basis of the image correction data; and (f) outputting a photographic image on the basis of the corrected image.

* * * * *